(12) United States Patent
Yu et al.

(10) Patent No.: US 11,339,092 B2
(45) Date of Patent: May 24, 2022

(54) NON-FLOWABLE QUICK-SETTING PHOSPHATE CEMENT REPAIR MATERIAL WITH STRONG COHESIVE FORCES AND PREPARATION METHOD THEREOF

(71) Applicants: Jiahuan Yu, Liaoning (CN); George Jiebao Yu, Liaoning (CN)

(72) Inventors: Jiahuan Yu, Liaoning (CN); George Jiebao Yu, Liaoning (CN)

( * ) Notice: Subject to any disclaimer, the term of this patent is extended or adjusted under 35 U.S.C. 154(b) by 148 days.

(21) Appl. No.: 15/946,775

(22) Filed: Apr. 6, 2018

(65) Prior Publication Data
US 2020/0377411 A1 Dec. 3, 2020

(30) Foreign Application Priority Data

Apr. 7, 2017 (CN) .......................... 201710223266.6

(51) Int. Cl.

| | | |
|---|---|---|
| *C04B 12/02* | (2006.01) | |
| *C04B 14/06* | (2006.01) | |
| *C04B 18/08* | (2006.01) | |
| *C04B 18/14* | (2006.01) | |
| *C04B 22/00* | (2006.01) | |
| *C04B 28/28* | (2006.01) | |
| *C04B 20/00* | (2006.01) | |
| *C04B 103/20* | (2006.01) | |
| *C04B 111/72* | (2006.01) | |

(52) U.S. Cl.
CPC ............ *C04B 12/025* (2013.01); *C04B 14/06* (2013.01); *C04B 18/08* (2013.01); *C04B 18/146* (2013.01); *C04B 20/0048* (2013.01); *C04B 22/0013* (2013.01); *C04B 28/28* (2013.01); *C04B 2103/20* (2013.01); *C04B 2111/72* (2013.01); *C04B 2201/10* (2013.01); *C04B 2201/50* (2013.01)

(58) Field of Classification Search
CPC ....... C04B 12/025; C04B 14/06; C04B 18/08; C04B 18/146; C04B 20/0048; C04B 22/0013; C04B 28/28; C04B 2103/20; C04B 2111/72; C04B 2201/10; C04B 2201/50; C04B 28/344; C04B 2111/20; C04B 2201/05; C04B 2201/52; C04B 16/0633; C04B 2201/20; C04B 28/34; Y02W 30/91
See application file for complete search history.

(56) References Cited

U.S. PATENT DOCUMENTS

| | | | | |
|---|---|---|---|---|
| 3,960,580 | A * | 6/1976 | Stierli | C04B 28/34 501/111 |
| 4,756,762 | A * | 7/1988 | Weill | C04B 28/34 106/691 |
| 2014/0096704 | A1* | 4/2014 | Rademan | C04B 28/34 106/666 |

FOREIGN PATENT DOCUMENTS

| | | | | | |
|---|---|---|---|---|---|
| CN | 1415573 | A | * | 5/2003 | ............ C04B 28/34 |
| CN | 102276191 | A | * | 12/2011 | |
| CN | 103145396 | A | * | 6/2013 | |
| CN | 104478371 | A | * | 4/2015 | |
| KR | 100982469 | B1 | * | 9/2010 | ............ C04B 28/02 |

OTHER PUBLICATIONS

John Bensted, 14—Special Cements, Editor(s): Peter C. Hewlett, Lea's Chemistry of Cement and Concrete (Fourth Edition), Butterworth-Heinemann, 1998, pp. 821-822, 14.4.10 Magnesia-Ammonium Phosphate Cement (Year: 1998).*
CN102276191 A Abstract machine translation (Year: 2011).*
CN103145396 A machine translation (Year: 2013).*
CN104478371 A machine translation (Year: 2015).*
CN1415573 A machine translation (Year: 2003).*
KR-100982469-B1 machine translation (Year: 2010).*
Caijun Shi, Jianming Yang, Nan Yang, Yuan Chang, Effect of waterglass on water stability of potassium magnesium phosphate cement paste, Cement and Concrete Composites, vol. 53, 2014, pp. 83-87,ISSN 0958-9465, DOI:10.1016/j.cemconcomp.2014.03.012 (Year: 2014).*
Sam A. Walling and John L. Provis Chemical Reviews 2016 116 (7), 4170-4204 DOI: 10.1021/acs.chemrev.5b00463 (Year: 2016).*

* cited by examiner

*Primary Examiner* — Kevin E Yoon
*Assistant Examiner* — Marites A Guino-O Uzzle
(74) *Attorney, Agent, or Firm* — Houtteman Law LLC

(57) ABSTRACT

The present invention belongs to the field of composite materials, and particularly to a non-flowable quick-setting phosphate cement repair material with strong cohesive forces and the preparation method thereof. The material comprises the following raw materials in percentage by weight: 20% to 40% of sand, 5% to 12% of ammonium dihydrogen phosphate, 10% to 25% of magnesium oxide, 2% to 8% of fly ash, 30% to 60% of rubber powder, 6% to 10% of silica fume, 0.35% to 0.6% of a polycarboxylate high efficiency water-reducing agent, 1% to 5% of sodium silicate, 1.5% to 2% of a polypropylene fiber, 0.5% to 2% of a retarder, and 8% to 10% of water. The material is used as the repair material for the special positions of bottom boards of bridges or facades of buildings which are damaged, and the repair effect thereof is remarkable.

10 Claims, No Drawings

… (1)

NON-FLOWABLE QUICK-SETTING PHOSPHATE CEMENT REPAIR MATERIAL WITH STRONG COHESIVE FORCES AND PREPARATION METHOD THEREOF

TECHNICAL FIELD

The present invention belongs to the field of composite materials, and particularly to a non-flowable quick-setting phosphate cement repair material with strong cohesive forces and the preparation method thereof.

BACKGROUND ART

In recent years, a large number of buildings with reinforced concrete structures have risen straight from the ground. As a result, a variety of durability damages of the concrete structure have emerged. When such damages occur on bottom boards of bridges or facades of buildings, they need to be repaired in time. Due to the special traits of the positions to be repaired, the difficulties in repairing are increased with the requirement that the repair materials must have the characteristics of non-flowability, strong cohesive forces, quick-setting, non-shrinkage, crack resistance, and high early strength.

Many researchers have studied and developed on magnesium phosphate cement-based materials. For example, YANG Nan systematically studied the influence of factors such as water-cement ratio, curing conditions, interfacial humidity, interfacial treatment modes, interfacial agents, matrix strength and the like on the bonding strength of magnesium phosphate cement repair materials and old silicate cement mortar in "Study on Bonding Performance of Magnesium Phosphate Cement-Based Materials"; and LUO Yali analyzed and discussed the influence rules of factors such as the molar ratio of MgO to $KH_2PO_4$, water-binder ratio, the incorporation amount of borax and the like on the strength of magnesium phosphate cement using the orthogonal experimental method in "Experimental Research and Project Application of New Type Early-Strengthening Magnesium Phosphate Cement". All of the above-mentioned repair materials have the characteristics of short setting time, high early strength, small dry shrinkage (good volume stability), good matching with the properties of old concrete, and high bonding strength; however, for the special positions of bottom boards of bridges or facades of buildings which are damaged, the repair material is required to overcome its own gravity and well bond with the original repairing surface, have good crack resistance, non-flowability, non-shrinkage, quick setting and hardening, and the like. To date, there is no repair material capable of achieving the repairing on such special positions, the fundamental cause of which is that there is no repair material with ideal properties and reasonable processes capable of dealing with the damage problems occurring on the bottom boards of bridges or the facades of buildings.

SUMMARY OF THE INVENTION

In view of the above problems, the present invention combines the common problems of the existing building materials with the requirements of the state for new building materials, and provides a low cost, easy-to-process, -store and -transport cement repair material with non-flowability, quick setting and hardening, non-shrinkage, good crack resistance, and strong cohesive forces. The material is used as the repair material for the special positions of bottom boards of bridges or facades of buildings which are damaged, and the repair effect thereof is remarkable.

In order to achieve the above object, the present invention provides a cement repair material comprising the following raw materials in percentage by weight: 20% to 40% of sand, 5% to 12% of ammonium dihydrogen phosphate, 10% to 25% of magnesium oxide, 2% to 8% of fly ash, 30% to 60% of rubber powder, 6% to 10% of silica fume, 0.35% to 0.6% of a polycarboxylate high efficiency water-reducing agent, 1% to 5% of sodium silicate, 1.5% to 2% of a polypropylene fiber, 0.5% to 2% of a retarder, and 8% to 10% of water.

The sand is medium sand having a fineness modulus of 2.5, a mud content of 0.8%, no clod, and an apparent density of 2700 $kg/m^3$.

The polypropylene fiber is preferably a hollow polypropylene fiber; and the retarder is borax.

In order to achieve the above object, the present invention further provides a preparation method of the repair material, the phosphate cement rapid repair material is prepared by the specific steps of successively weighing the ammonium dihydrogen phosphate, magnesium oxide, fly ash, rubber powder, silica fume, polycarboxylate high efficiency water-reducing agent, sodium silicate, retarder, and sand according to the required weight ratio of the raw materials, then adding them to a mixing drum of a mixer to stir at a constant speed for 5 to 10 minutes until the nine materials are stirred uniformly; slowly adding water of the required weight to the mixing drum and then stirring continuously for 1 to 2 minutes until a uniform pasty slurry with good flowability is formed, and subsequently adding a hollow polypropylene fiber of the desired weight and stirring for 30 seconds.

Beneficial Effects of the Invention

In order to thoroughly solve the damages on special positions of bottom boards of bridges or facades of buildings, the present invention provides a non-flowable, non-shrinkable, crack resistant quick-setting rapid-hardening phosphate cement repair material with strong cohesive forces, which fully exerts its advantages of non-flowability, quick setting and hardening, non-shrinkage, good crack resistance, strong cohesive forces and the like, the performance of which is superior to that of other repair materials in the cement industry. After this type of repair material is widely used, it not only solves the problem of insufficient bonding strength at the bottom boards of bridges and the facades of buildings, but also guarantees the thickness requirement of repairing, and brings significant economic and social benefits.

The characteristic requirements and analysis of each raw material selected for use in the present invention are as follows: magnesium oxide is formed by crushing magnesite ($MgCO_3$) after being calcined at a high temperature of about 1700° C., generally MgO used for preparing cement is powder (220 mesh) ground from crystals, the colour of which is brownish-yellow with a specific surface area of 2700 $cm^2/g$, and its activity and specific surface area play a decisive role in the hydration reaction rate, hydration heat release, working performance and strength of the phosphate cement; in order to slow the hydration rate of phosphate cement, magnesium oxide calcined at a high-temperature is used, on the surface of which a layer of inert film is formed to reduce the activity of magnesium oxide, and in addition, the specific surface area of magnesium oxide is also an important aspect for controlling the hydration rate; the setting time for hydration of cement mainly depends on two factors: first, the amount of early hydration products, and second, the gap among particles, specifically, the finer the cement, the faster the hydration rate, the more the hydration products, and the shorter the setting time; the larger the gap among the cement particles, the more the hydration products needed to fill and wrap, and the setting time is relatively extended; the suitable fineness and gradation of magnesium oxide particles can achieve good working performance. The ammonium dihydrogen phosphate adopts the ordinary ammonium dihydrogen phosphate, which is a white crystalline powder, stable in the air, the role of which is to provide an alkaline environment, and the nature of hydration reaction of phosphate cement is an acid-base reaction, the extent of such reaction is greatly affected by the amount of substances of two reactants; therefore, the present invention strictly controls the ratio of ammonium dihydrogen phosphate and magnesium oxide, and the ammonium dihydrogen phosphate and magnesium oxide can fully react only in a certain ratio (1/4 to 3/4) to form a dense hydration product; if the phosphate is excess, the phosphate in the entire hydration system is excess, a large amount of phosphate in the hydration system would dissolve out due to the low strength of phosphate and its good solubility in water, so that a larger porosity would be formed and the strength would be influenced, and if the proportion of magnesium oxide is too high, the reaction rate is too fast, the shaping effect is poor, which would also influence the strength. The fly ash is grey powder, which mainly plays a role of reinforcing the magnesium phosphate cement and improves the flowability of the cement slurry and the old concrete's bonding performance. The rubber powder is a two-component aqueous waterproof coating made of a polymer emulsion and cement or other inorganic additives, can achieve anti-permeability, moisture-proof, bonding and anti-cracking effects and the like, has double functions of waterproof and decoration, and belongs to non-toxic, harmless and green environmental protection products and plays a role of providing strong cohesive forces. The silica fume is grey or grey-white powder in appearance, has a refractoriness of greater than 1600° C., can improve the properties of bending strength, compressive strength, abrasion resistance and the like, and is used to control the reduction of flowability. The polycarboxylate high efficiency water-reducing agent is used to control the flowability of the cement slurry, the flowability of which will be reduced with the increased incorporation amount of the polycarboxylate high efficiency water-reducing agent. The polypropylene fiber is a polymer compound produced mainly by polymerization of propylene, and it is white in appearance, odorless, non-toxic, light, translucent, and soft to touch, similar to hair on the surface of the molded concrete, and it can control dry shrinkage rate and enhance crack resistance. Sodium silicate has a strong bonding property and higher strength, and is used for the formulation of a quick-setting water reducing agent. The retarder borax is white crystalline powder, odourless, salty in taste, with a relative density of 1.73; it is slightly soluble in water, the aqueous solution of which is alkaline; it can be slowly weathered in the air; it can become a colorless glassy substance when melted; and it is mainly used to regulate the setting time of the cement. The water used is tap water without impurities.

Compared with the prior art, the present invention has the following advantages: (1) the present repair material has quick-setting and rapid-hardening, and early-strengthening features, and can reach a certain strength in a short time, and the compressive strength at 1 hour exceeds 30 MPa, and the mid-late strength can be higher, and all performance indicators meet the industrial standards; (2) the present repair material is non-flowable and non-shrinkable, because the damages are located on the facades of the buildings or the top surfaces of the bottom boards of bridges, the repair material must have non-flowablity and high bonding property, and have non-shrinkage after repaired, which can meet the various requirements of working performance; (3) the present repair material has good crack resistance and strong bonding performance, and can increase the overall stiffness of the structure; and (4) the phosphate cement rapid repair material is a new type building material, in terms of its process and principle, it is possible to make use of the equipment commonly used by the manufacturing enterprises, and in case of no addition of other equipment, a large-scale production can be carried out with low cost, furthermore, the raw materials are sufficient, and the purchasing, processing, storage and transportation thereof are very convenient. Therefore, the present repair material is an ideal rapid repair material product for the current construction industry.

DETAILED DESCRIPTION OF EMBODIMENTS

The present invention will be further described below in combination with specific examples.

Example 1

The phosphate cement-based rapid repair material was prepared by firstly adding 5% of ammonium dihydrogen phosphate, 20% of magnesium oxide, 2% of fly ash, 30% of rubber powder, 6% of silica fume, 0.4% of polycarboxylate high efficiency water-reducing agent, 1.6% of sodium silicate, and 0.5% of retarder to a mixer to be uniformly stirred, then feeding 25% of sand to the mixer to be uniformly stirred, followed by adding 8% of water to the mixing drum slowly, continuously stirring for 1 to 2 minutes after water was added completely until a uniform pasty slurry with good flowability was formed, and subsequently adding 1.5% of a polypropylene fiber and stirring for 30 seconds.

The test results of the fly ash were shown in Table 1.

TABLE 1

The test results of the fly ash.

| | GBJI46-90 Specification requirements | | | |
|---|---|---|---|---|
| Test Items | I | II | III | Fly ash |
| Fineness (residue on 45 μm square hole sieve) (%) | ≤12 | ≤20 | ≤45 | 10.9 |
| Ignition Loss (%) | ≤6 | ≤8 | ≤15 | 4.65 |
| Water demand (%) | ≤95 | ≤105 | ≤115 | 89 |
| Sulfur trioxide content (%) | ≤3 | ≤3 | ≤3 | 1.2 |

I. The Test Results of Performance of the Phosphate Cement-Based Rapid Repair Material.

1. Setting Time.

The instruments and apparatus specified in GB1346 "Method for Detecting Water Consumption for Cement Standard Consistency, Setting Time, and Stability of Cement" were used as experimental instruments.

300 g of the phosphate cement rapid repair material was poured into a mixing pot, 30 g of tap water was added, and stirred quickly to be uniform, the material was immediately placed in a round molds, vibrated for several times, and wiped to dry after removing excess thick slurry, and the initial setting time was determined to be 10 minutes, and the final setting time was 16 minutes.

2. Compressive Strength.

The phosphate cement rapid repair raw materials were weighed according to the proportions in Example 1, and then poured into a stirring pot and stirred rapidly. After taken out from the pot, it was immediately poured into a 4×4×16 cm³ test mold, and tamped 20 times with a tamper stick and the test mold was vibrated on the ground for 2 to 3 minutes while wiping the repair material overflowing the surface off with a trowel, and three sample strips in the same test mold were numbered and marked with age and the like. Since the repair material was air-cured, no watering was required. The strengths were tested after 1 hour, 3 hours, 1 day, 7 days, 28 days, 60 days, and 90 days, respectively. The results were shown in Table 2, and the results were the average of three samples.

TABLE 2

Mechanical property test.

| Experimental materials | Strength (MPa) | Age | | | | | | | |
|---|---|---|---|---|---|---|---|---|---|
| | | 1 h | 3 h | 1 d | 3 d | 7 d | 28 d | 60 d | 90 d |
| Phosphate rapid repair material | Bending strength | 5.3 | 6.1 | 7.5 | 8.1 | 10.2 | 10.9 | 11.8 | 12 |
| | Compressive Strength | 32.2 | 36.1 | 52.2 | 57.1 | 56.2 | 72.3 | 75.8 | 77.6 |
| | Ratio of bending-compressive strength | 0.168 | 0.17 | 0.162 | 0.16 | 0.162 | 0.155 | 0.156 | 0.155 |

The one-hour strength had reached 32.2 MPa and the bending strength had reached 5.3 MPa, and 28-day strengths had reached 72.3 MPa and 10.9 MPa, respectively, and both the 60-day and 90-day strengths had grown slowly without reduction phenomenon in strengths. It can be seen that in the sub-zero temperature environment, after repairing the external facade of a wall with this material, the repair material exhibited obvious properties such as non-flowability, quick-setting and rapid-hardening, strong cohesive forces and the like, and its one-hour strength had reached 30 MPa or higher, the bending strength had reached 5 MPa or higher. The specific experimental data were shown in Table 2.

Example 2

The phosphate cement-based rapid repair material comprises 20% of sand, 6% of ammonium dihydrogen phosphate, 18% of magnesium oxide, 3% of fly ash, 32% of rubber powder, 7% of silica fume, 0.5% of a polycarboxylate high efficiency water-reducing agent, 1.5% of sodium silicate, 2% of a polypropylene fiber, 1% of a retarder, and 9% of water.

The invention claimed is:

1. A non-flowable quick-setting phosphate cement repair material with cohesive forces, wherein the phosphate cement repair material comprises the following raw materials in percentage by weight: 20% to 40% of sand, 5% to 12% of ammonium dihydrogen phosphate, 10% to 25% of magnesium oxide, 2% to 8% of fly ash, 30% to 60% of rubber powder, 6% to 10% of silica fume, 0.35% to 0.6% of a polycarboxylate water-reducing agent, 1% to 5% of sodium silicate, 1.5% to 2% of a polypropylene fiber, 0.5% to 2% of a retarder, and 8% to 10% of water.

2. The phosphate cement repair material of claim 1, wherein the sand is medium sand having a fineness modulus of 2.5, a mud content of 0.8%, no clod, and an apparent density of 2700 kg/m³.

3. The phosphate cement repair material of claim 1, wherein the retarder is borax.

4. The phosphate cement repair material of claim 1, wherein the phosphate cement repair material comprises the following raw materials in percentage by weight: 25% of sand, 5% of ammonium dihydrogen phosphate, 20% of magnesium oxide, 2% of fly ash, 30% of rubber powder, 6% of silica fume, 0.4% of a polycarboxylate water-reducing agent, 1.6% of sodium silicate, 1.5% of a polypropylene fiber, 0.5% of a retarder, and 8% of water.

5. The phosphate cement repair material of claim 1, wherein the phosphate cement repair material comprises the following raw materials in percentage by weight: 20% of sand, 6% of ammonium dihydrogen phosphate, 18% of magnesium oxide, 3% of fly ash, 32% of rubber powder, 7% of silica fume, 0.5% of a polycarboxylate water-reducing agent, 1.5% of sodium silicate, 2% of a polypropylene fiber, 1% of a retarder, and 9% of water.

6. The phosphate cement repair material of claim 1, wherein the phosphate cement repair material is prepared by specific steps of successively weighing the ammonium dihydrogen phosphate, magnesium oxide, fly ash, rubber powder, silica fume, polycarboxylate water-reducing agent, sodium silicate, retarder, and sand according to the required weight ratio of the raw materials, then adding them to a mixing drum of a mixer to stir at a constant speed for 5 to 10 minutes until the nine materials are stirred uniformly; slowly adding water of the required weight to the mixing drum and then stirring continuously for 1 to 2 minutes until a uniform pasty slurry with good flowability is formed, and subsequently adding a hollow polypropylene fiber of the desired weight and stirring for 30 seconds.

7. The phosphate cement repair material of claim 2, wherein the phosphate cement repair material is prepared by specific steps of successively weighing the ammonium dihydrogen phosphate, magnesium oxide, fly ash, rubber powder, silica fume, polycarboxylate water-reducing agent, sodium silicate, retarder, and sand according to the required weight ratio of the raw materials, then adding them to a mixing drum of a mixer to stir at a constant speed for 5 to 10 minutes until the nine materials are stirred uniformly; slowly adding water of the required weight to the mixing drum and then stirring continuously for 1 to 2 minutes until a uniform pasty slurry with good flowability is formed, and subsequently adding a hollow polypropylene fiber of the desired weight and stirring for 30 seconds.

8. The phosphate cement repair material of claim 3, wherein the phosphate cement repair material is prepared by specific steps of successively weighing the ammonium dihydrogen phosphate, magnesium oxide, fly ash, rubber powder, silica fume, polycarboxylate water-reducing agent, sodium silicate, retarder, and sand according to the required weight ratio of the raw materials, then adding them to a mixing drum of a mixer to stir at a constant speed for 5 to 10 minutes until the nine materials are stirred uniformly; slowly adding water of the required weight to the mixing drum and then stirring continuously for 1 to 2 minutes until a uniform pasty slurry with good flowability is formed, and subsequently adding a hollow polypropylene fiber of the desired weight and stirring for 30 seconds.

9. The phosphate cement repair material of claim 4, wherein the phosphate cement repair material is prepared by specific steps of successively weighing the ammonium dihydrogen phosphate, magnesium oxide, fly ash, rubber powder, silica fume, polycarboxylate water-reducing agent, sodium silicate, retarder, and sand according to the required weight ratio of the raw materials, then adding them to a mixing drum of a mixer to stir at a constant speed for 5 to 10 minutes until the nine materials are stirred uniformly; slowly adding water of the required weight to the mixing drum and then stirring continuously for 1 to 2 minutes until a uniform pasty slurry with good flowability is formed, and subsequently adding a hollow polypropylene fiber of the desired weight and stirring for 30 seconds.

10. The phosphate cement repair material of claim 5, wherein the phosphate cement repair material is prepared by specific steps of successively weighing the ammonium dihydrogen phosphate, magnesium oxide, fly ash, rubber powder, silica fume, polycarboxylate water-reducing agent, sodium silicate, retarder, and sand according to the required weight ratio of the raw materials, then adding them to a mixing drum of a mixer to stir at a constant speed for 5 to 10 minutes until the nine materials are stirred uniformly; slowly adding water of the required weight to the mixing drum and then stirring continuously for 1 to 2 minutes until a uniform pasty slurry with good flowability is formed, and subsequently adding a hollow polypropylene fiber of the desired weight and stirring for 30 seconds.

* * * * *